(12) United States Patent
Hanson et al.

(10) Patent No.: US 7,309,331 B2
(45) Date of Patent: Dec. 18, 2007

(54) ODOR ABSORBENT EVAPORATIVE PAD

(75) Inventors: Allan G. Hanson, Granville, OH (US); Frances Lampi, Circleville, OH (US)

(73) Assignee: Columbus Industries, Inc., Ashville, OH (US)

( * ) Notice: Subject to any disclaimer, the term of this patent is extended or adjusted under 35 U.S.C. 154(b) by 0 days.

(21) Appl. No.: 11/232,556

(22) Filed: Sep. 22, 2005

(65) Prior Publication Data

US 2006/0060992 A1   Mar. 23, 2006

Related U.S. Application Data

(60) Provisional application No. 60/612,084, filed on Sep. 22, 2004.

(51) Int. Cl.
| | |
|---|---|
| A61F 13/15 | (2006.01) |
| B32B 3/10 | (2006.01) |
| B32B 7/04 | (2006.01) |
| B01D 47/16 | (2006.01) |

(52) U.S. Cl. .............. 604/385.101; 604/378; 604/385.01; 604/359; 604/360; 428/137; 428/154; 428/155; 261/94

(58) Field of Classification Search ........... 604/378, 604/385.101, 385.01, 359, 360, 367; 422/5; 55/486, 524; 428/137, 154, 155; 261/94
See application file for complete search history.

(56) References Cited

U.S. PATENT DOCUMENTS

| | | |
|---|---|---|
| 4,504,290 A | 3/1985 | Pontius |
| 4,793,837 A | 12/1988 | Pontius |
| 4,955,995 A | 9/1990 | Pontius |
| 5,536,264 A * | 7/1996 | Hsueh et al. ............... 604/368 |
| 6,110,564 A | 8/2000 | Pontius |

* cited by examiner

Primary Examiner—Jacqueline F. Stephens
(74) Attorney, Agent, or Firm—Jason H. Foster; Kremblas, Foster, Phillips & Pollick

(57) ABSTRACT

An evaporative pad comprising a plurality of layers of highly absorbent slit and expanded wicking papers and at least one layer of slit and expanded non-absorbent material carrying a coating of adsorbent particles bonded to exposed surfaces of the layer of non-absorbent material disposed between a pair of adjacent wicking layers in the pad. The wicking layers and non-absorbent layer coated with adsorbent particles are disposed in parallel overlying relationship to one another and bonded together to form the evaporative pad.

6 Claims, 2 Drawing Sheets

ODOR ABSORBENT EVAPORATIVE PAD

CROSS-REFERENCES TO RELATED APPLICATIONS

This application claims the benefit of U.S. Provisional Application No. 60/612,084 filed Sep. 22, 2004.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to evaporative filter pads of the type employed in humidifiers and evaporative coolers and particularly to an improved pad having odor-removal characteristics.

2. Description of the Related Art

Evaporative pad filters are typically used in humidifier and evaporative cooling applications wherein the pad is wetted while air is forced through the pad. The outflow air picks up water vapor and is cooled by losing heat during the evaporative process. Depending upon the primary goal, either humidification or cooling is emphasized by the design of the appliance and the ambient conditions of operation of the appliance.

There are several well-known forms of evaporative pads. One of the more popular types typically employed in residential forms of room humidifiers is a pad comprising a plurality of sheets or layers of slit and expanded highly adsorbent wicking paper or thin sheets of aluminum coated with an absorbent material.

The two highly popular forms of wetting of the pad are the drip down or top fed types and the wick-up types. In the former, a constant supply of water is fed to the top of the pad which drips downward via the force of gravity to wet the remainder of the pad. Such pads typically consist of layers of slit and expanded aluminum often coated with particles having absorbent characteristics. In the latter wick-up types, the lower portion of the pad rests in a reservoir of water which is wicked upwards through the pad comprising layers of slit and expanded absorbent paper. However, wicking paper pad could also be drip fed from the top of the pad if desired.

The pads comprising wicking paper have become very popular in home humidifiers and evaporative coolers because of their lower cost and good efficiency. While some prior and current type of evaporative pads have been satisfactory, significant improvements have not been advanced for many years.

One of the problems which arises in connection with appliances using evaporative pads is the presence of some offensive odors from sources in the incoming air flow unrelated to the pads or those which may arise from the evaporative process which takes place in the pad itself.

Bacteria carried by the ambient air passing through the pad are one likely source of odors formed within the pad as the bacteria tend to multiply in the friendly, moist environment formed during use of the wetted pad. While some of these types of pads include one or more layers treated with a bactericide, such a layer primarily reduces air borne microbes contacting the treated layer. However, such a layer has no direct absorption effect of noxious gaseous odors present in the ambient air passing through the pad.

While some prior attempts have been made to address this problem, a satisfactory, economical solution which provides significant odor removal capabilities, particularly to wicking type filters has eluded those of ordinary skill in the art.

In order to be commercially satisfactory, an evaporative pad having significant odor removal capabilities must be economically feasible for wide spread residential use. This includes relatively low cost raw materials and manufacture, minimal rise in pressure drop through the pad, and no significant loss of odor removal efficiency in the wet environment of a humidifiers appliance.

BRIEF SUMMARY OF THE INVENTION

The present invention provides an evaporative pad having odor removing capabilities and comprises a plurality of layers of slit and expanded highly absorbent material, such as wicking paper for example, and at least one odor adsorbent layer comprising a slit and expanded material having little or no absorbent characteristics but which carries a coating of odor adsorbing particles on opposing major faces of the layer. The slit and expanded layers of highly absorbent material and the adsorbent coated layers are disposed in parallel overlying relationship relative to one another and bonded together to form a stack.

In one preferred embodiment, the absorbent layers comprise sheets of wicking paper and the non-absorbent layer is a sheet of paper carrying a coating or film of non-absorbent material, such as plastic, and a coating of the adsorbent particles bonded over the plastic-coated outer opposing major surfaces.

The adsorbent particles may be activated carbon, zeolite, synthetic molecular sieves or a combination of one or more such adsorbent particles.

Further, one or more of the odor adsorbing layers may be included within the pad and each adsorbent layer may be coated with the same adsorbent particles or a different adsorbent material. The adsorbent layer or layers may be disposed on either the upstream or downstream face of the pad or within the pad between the wicking papers layers.

In accordance with the present invention, an efficient evaporative pad useful in humidifiers or evaporative coolers having odor reduction characteristics is provided in a relatively inexpensive and effective manner.

Figure 2:
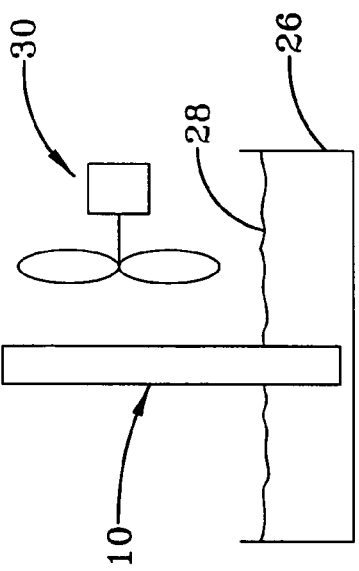
FIG. 2 is a schematic view of a conventional wicking upward type of humidifier which may usefully employ evaporative pads constructed in accordance with the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 1:
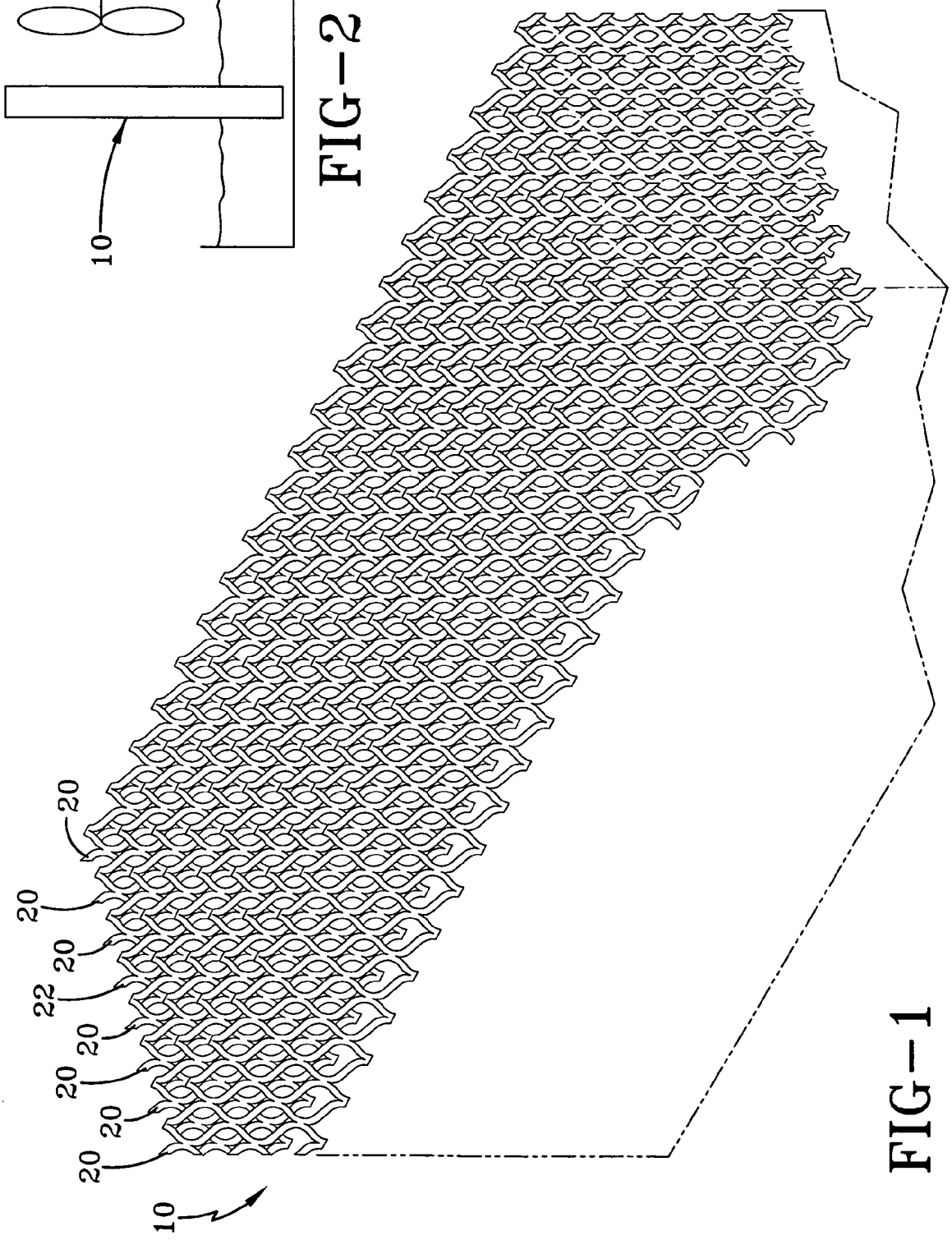
FIG. 1 is a partial perspective view of one preferred embodiment of the present invention.

An evaporative pad filter 10 constructed in accordance with the present invention is shown in FIG. 1 and includes a plurality of slit and expanded layers of wicking paper, such as 20, disposed in parallel overlying relationship to one another to form a stack. The number of such paper layers 20 may vary depending upon the requirements of the application. However, a preferred number of layers 20 typically used is between about 8 to 24 which covers most of the usual residential applications for room humidifiers or evaporative coolers. Evaporative pads using only wicking paper layers of this type are currently used, for example, in the well-known wicking type humidifiers having a configuration such as generally illustrated in FIG. 2.

In such room humidifiers as shown in FIG. 2, a container 26 forms a reservoir for a given volume of water 28. A fan 30 drives air through a major exposed area of the pad 10. Pad 10 is vertically disposed within the device with its lower end disposed in the water and a major portion exposed to air flow created by fan 14.

As used herein, wicking paper means a highly adsorbent paper product having a relatively high capillary rise value. Capillary rise is a measure of the rate of absorption of water and is referred to as Klemm in the paper industry. Typically it is a measure of the rate of travel or rise of water in the paper sheet having a portion of the sheet disposed in contact with the water. A preferred wicking paper useful in the present invention and well-known for evaporative pad applications in the art is currently commercially available from Ahlstrom Paper Group. This paper has a basis weight of 115 to 130 grams per meter, a wet tensile strength of 2 to 8 lbs. per inch, a Klemm value of about 45/16 inch to 70/16 inch per minute, and a thickness of about 18.5 to 24.5 mils. A small amount of wet strength resin is typically included to provide wet strength without sacrificing the desired high rate of absorption. Wicking paper having a Klemm value of about 55/16 inch or greater are preferred.

Evaporative pads having all layers of slit and expanded wicking paper laminated together in a stack are old and well-known as noted above. Further, evaporative pads comprising such layers of wicking paper and one or more layers of slit and expanding non-wicking paper are also known and used in humidifying applications such as described in U.S. Pat. No. 6,110,564.

Additionally, evaporative pads comprising a stack of layers of wicking paper including one or more layers of thin, slit and expanded metal layers for reinforcing strength are well-known in the industry.

While all such prior evaporative pads employed in the wicking-up type of humidifiers or evaporative coolers function satisfactorily with respect to the humidifying or evaporative cooling functions, none effectively combat offensive odors carried by the air stream passing through the pad or generated in the pad itself during normal use.

In accordance with the present invention, a wicking type evaporative pad 10 comprises a plurality of slit and expanded wicking paper layers 20 stacked in overlying relationship to one another and additionally at least one slit and expanded non-absorbent layer 22 coated on both major surfaces with adsorbent particles, such as, for example, activated carbon.

This carbon coated layer may be laminated to at least one slit and expanded wicking paper layer 20 and preferably is disposed between two wicking paper layers 20 and laminated to opposing major surfaces of the adjacent wicking paper layers 22.

As seen in FIG. 1, a stack of slit and expanded wicking paper layers, such as 20, includes a layer 22 of slit and expanded relatively non-absorbent material coated with activated carbon particles. Layer 22 is slit and expanded in the same manner as the wicking paper layers 20 prior to applying the coating of adsorbent particles. Conventional slit and expanding methods are well-known in the art. This process creates generally diamond shaped openings bounded by sides at an angle less than 90 degrees relative to a plane perpendicular to the plane of a layer such as 20 or 22. This opening creates passages for air flow through pad 10 when the layers are stacked in overlying relationship as shown in FIG. 1.

The layers 20 and 22 are preferably conventionally laminated to one another by an adhesive in a manner wherein only the points of contact between adjacent layers are bonded and the diamond-shaped openings remain unobstructed for the passage of air.

Layer 22, carrying the coating of activated carbon, preferably comprises a non-absorbent or at least, a very low absorbent material. The preferred materials include metals, such as aluminum, plastics, or low absorbent paper. A more preferred material comprises a plastic coated paper. One such type of plastic coated paper found very useful for this application is a photograph backing paper.

This type of paper is a polyethylene coated paper is generally non-adsorbent and therefore is not readily wetted when exposed adjacent to the wet layers of wicking paper 20 during use in a wicking evaporative pad appliance. Since it tends not to absorb water, it retains its original shape and further offers a measure of reinforcing support to the wetted absorbent wicking layers which tend to sag somewhat when thoroughly wetted.

Additionally, the plastic coating which functions to reduce absorbency also aids in the coating process used to bond the activated carbon particles to the opposing major surfaces of layer 22 by providing a surface which binder coated absorbent particles readily adhere.

While there is some latitude in the choice of activated carbon particles employed to coat layer 22 depending upon the particular application and the level of odor removal desired, a preferred activated carbon product is a coconut shell carbon. A carbon product useful in the present invention is currently specified as having a $CCl_4$ activity level of at least about 60 percent, a maximum moisture content of 5 percent and a particle size of 325× Fines pursuant to ASTM standard D-2862. Its surface area is rated as 1200 $m^2/g$. However, other specifications may be designed to suit the particular application, including the use of other adsorbent particles as noted herein.

The particles of activated carbon may be applied to the plastic coated layer using conventional coating processes. A preferred method of coating provides a roll of the priorly slit and expanded plastic coated paper layer 22 which is unrolled and pulled through a submersion tank that is filled with a suitable liquid emulsion containing a binder and the activated carbon particles. The amount or thickness of the activated carbon particles applied to layer 22 is preferably controlled primarily by the viscosity of the binder/activated carbon particle mix, assuming the percentage amount of activated carbon particles in the bath remains relatively constant within reasonable limits and the speed of moving the plastic coated paper layer through the bath in the tank remains relatively constant within the practical limits of volume production. The practical production time in a continuous process is influenced by the time required in the next step wherein the carbon coated layer 22 leaving the bath is passed through an oven to drive off water and set the binder.

As the wet coated layer 22 exits the binder mix tank, it is subjected to a pair of squeeze type rollers and then a forced air stream to remove any binder film which may extend across the generally diamond-shaped openings in layer 22.

In any suitable and well known manner, the wicking paper layers 20 and one or more activated carbon coated layers 22 are laminated together and cut to size to form the stacked pad 10. In one preferred method, a thin film of plastic adhesive is inserted between the adjacent layers 20 and 22 in the stack and heated to melt the adhesive. Upon cooling, the adjacent layers are bonded to one another only at the points of contact with the adjacent surfaces of the slit and expanded layers 20 or 22 and leave the diamond shaped openings unobstructed as is well-known in this art.

The finished pad 10, cut to appropriate size, may then be placed in a conventional residential room humidifier of the wicking type, such as schematically illustrated in FIG. 2.

As noted earlier, such humidifiers include a reservoir 26 filled to a predetermined height with water 28 and a fan 30 to drive ambient air through the wicking pad 10. Pad 10 is conventionally disposed in a vertical position with its lower end submerged in water 28 and a major upper portion exposed to the flow of air driven by fan 30.

In conventional fashion, water is absorbed by layers 20 in the submerged portion of pad 10 and carried upwardly via capillary action to the upper portions of pad 10 exposed to the flow of air.

In the typical application, the flow of incoming air through pad 10 picks up water vapor from the wetted layers of wicking paper prior to exiting the humidifier and flowing into the surrounding area.

In the conventional process using conventional evaporative pads, gaseous odors carried by the incoming air or those which may be generated otherwise within pad 10 are simply passed through the appliance to the ambient air. However, in accordance with the present invention, air is also passed through the activated carbon coated layer 22 wherein gaseous odors may be adsorbed by the activated carbon particles.

In one preferred embodiment, layer 22 is placed near the downstream end of pad 10 relative to the air flow. In this configuration, should gaseous odors develop in the pad or be present in the incoming air, they will be carried through layer 22 and exposed to adsorption by the activated carbon on layer 22. In another preferred embodiment, carbon coated layer 22 may be placed near the upstream end of pad 10. To obtain more odor removal efficiency, two or more layers 22 may be disposed between different layers 20 and located near the upstream or downstream ends of pad 10 or in both locations.

Surprisingly, testing has found that the activated carbon coating applied to layer 22 as described herein retains a very significant level of adsorbent activity even though it is disposed in a surrounding moist environment of adjacent layers 20. Since layer 22 is non-absorbent, water in reservoir 26 contacting the lower portion of layer 22 does not rise upwardly via capillary action to wet the upper portion of layer 22 as in wicking layers 20. Further, the activated carbon particles coated on major surfaces of layer 22 above the water level in reservoir 26 are isolated from direct contact with the adjacent wetted layers 20 of wicking paper by the configuration of the slit and expanded nature of layers 20 and 22.

While not being held to any particular theory, it is surmised that the surprising level of effectiveness of odor removal in this wet or moist environment obtained in accordance with the present invention is at least partly due to maintaining the liquid water absorbed in layers 20 from direct contact with the activated carbon coating so the capacity of adsorption of the activated carbon particles is minimally affected and gaseous odors in the passing air stream may be effectively absorbed.

Figure 3:
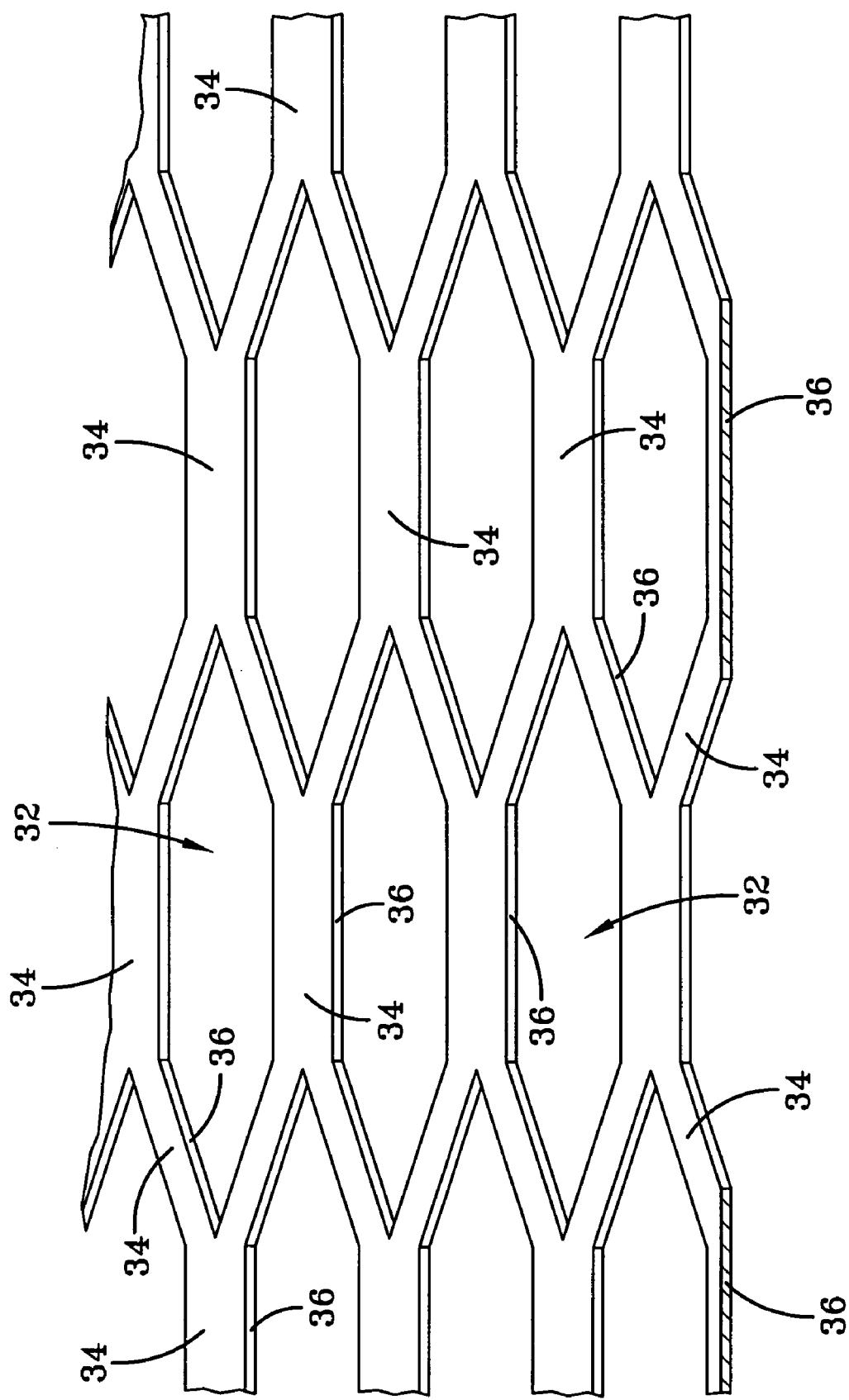
FIG. 3 is a diagrammatic view illustrating the general construction of a slit and expanded layer useful in the present invention.

It is believed that the shape and orientation of the generally diamond shaped openings 32 such as shown in FIG. 3, contribute to isolating the surface of the web portions, such as 34, surrounding each opening from intimate contact with the adjacent surfaces of such webs in the next adjacent layers 20 and 22. In other words, the webs 34 are rotated at an angle relative to the plane of layers 20 or 22 in an unexpanded state such that the primary contact between the adjacent expanded layers making up the pad 10 is limited substantially to the edges 36 of the web surrounding each opening 32. Edges 36 essentially represent the thickness of each layer 20 or 22. The major surface areas represented by webs 34 are generally free of or have minimum contact with the web surfaces 34 of adjacent layers. This construction contributes to maximizing contact of the air flow in the pad with the surfaces of webs 34.

These surfaces of webs 34 in layers 20 provide the wetted surface areas which, upon contact with the air flow passing through the diamond-shaped openings, such as 32, is subject to evaporation. The water vapor is then carried to the outlet of the humidifiers. This is the typical manner layers 20 function in this form of application.

However, this same construction of webs 34 in layer 22 tends to isolate the activated carbon coating on the surface of the webs 34 in layer 22 from direct contact with the water laden surfaces of webs 34 of adjacent layers 20. Significant direct contact between the wetted surfaces and the adsorbent particles coated on layer 22 would tend to permit liquid water to obstruct the pores of the adsorbent particles and significantly reduce adsorption activity of gaseous odor components in the air stream.

EXAMPLE I

A large roll of priorly slit and expanded plastic coated paper, such as described earlier herein, is positioned adjacent to a conventional submersion tank filled with a suitable emulsion bath containing a dispersion of activated carbon particles nominally of 325×F Mesh particle size.

The bath contained 940 pounds of water, 528 pounds of activated carbon, 290 pounds of binder, 3-5 pounds of a thickening agent and 90 pounds of an antifoaming agent which were well mixed to form an emulsion. The activated carbon particles become coated with the binder.

Useful binders include acrylics, stryenebutadiene, or chloride containing latexes such as vinyl chloride, vinylidene chloride and ethylene vinyl chloride. A preferred binder is an acrylic binder commercially available from the Rohn-Haas Corporation sold under the designation B-15. A preferred thickening agent also available from this company is sold under the designation ASE95. A preferred antifoaming agent is octanol.

The activated carbon in the bath, now coated with the binder, is then ready for introduction of the non-absorbent plastic coated paper layer.

The priorly expanded plastic coated paper layer 22 is conventionally pulled off the roll through the bath containing the binder and activated carbon. As the paper is submerged in and drawn through the bath, it becomes coated with the activated carbon particles carrying a binder coat. As the layer exits the mix tank, it is pulled through a pair of squeeze rollers and subjected to a forced air stream to free any openings in the slit and expanded paper from any binder film which may have formed. Then the coated layer 22 is directed through an oven at a temperature and for a time sufficient to drive off the water content and set the binder to bond the activated carbon particles to the plastic coated paper layer 22.

As noted earlier herein, one preferred manner to control the thickness of the layer of the activated carbon applied is preferably by adjusting the viscosity of the carbon particle/binder mix while maintaining the other factors constant. Ammonium hydroxide may be added to the binder in a quantity sufficient to adjust the viscosity to between about 700-1400 centipoises. Depending upon the other parameters chosen for the processing, typically a viscosity between 900 to 1300 centipoises works well in an otherwise conventional coating process of this nature.

The final product formed was found to possess a generally even coating of activated carbon particles which was effective to adsorb a significant portion of offensive odors when one or more layers were added to a plurality of layers of conventional wicking paper as described earlier.

It should be noted that the number of layers of wicking paper employed may be adjusted to the evaporative pad application in any suitable well-known manner. Further, it is often deemed suitable to employ wicking paper layers having different size openings than adjacent layers in making up the pad 10. This tends to render the path of incoming air through the pad 10 tortuous to increase contact time while bearing in mind that too large a pressure drop through the pad is undesirable.

It should be understood that the other adsorbent particles described herein may also be employed as described herein to provide the desired gaseous adsorbent efficacy for particular gaseous odor causing components.

While certain preferred embodiments of the present invention have been disclosed in detail, it is to be understood that various modifications may be adopted without departing from the spirit of the invention or scope of the following claims.

The invention claimed is:

1. An evaporative pad comprising, in combination,
    a) a plurality of slit and expanded layers of wicking paper having opposing major surfaces disposed in parallel overlying relationship to one another to form a stack; and
    b) at least one slit and expanded layer of a non-absorbent material, which is not readily wetted, disposed in parallel overlying relationship to a major surface of at least one of said layers of wicking paper and including a coating of adsorbent particles bonded to exposed outer surfaces of said layer of non-absorbent material; and
    c) means to secure said layers together to form the evaporative pad.

2. The evaporative pad in accordance with claim 1 wherein said layers of wicking paper and said layer of non-absorbent material are adhesively bonded to the adjoining layers.

3. The evaporative pad in accordance with claim 1 wherein said layer of non-absorbent material is a sheet of non-wicking paper having opposing major faces coated with a film of non-absorbent material underlying said coating of adsorbent particles.

4. In combination with an improved evaporative filter pad comprising a plurality of layers of slit and expanded wicking paper disposed in parallel adjoining relationship and bonded to one another to form a stack, the improvement comprising at least one layer of slit and expanded non-absorbent material disposed in bonded relationship between two of said layers of wicking paper, said layer of non-absorbent material being not readily wetted and having a coating of adsorbent particles bonded in overlying relationship to opposing major surfaces of said layer of non-absorbent material.

5. The evaporative pad in accordance with claim 1 wherein said adsorbent particles are activated carbon.

6. The evaporative pad in accordance with claim 1 wherein said adsorbent particles are taken from a group consisting of activated carbon, zeolite, and molecular sieves or a combination thereof.

* * * * *